United States Patent

Kim

[11] Patent Number: 5,950,451
[45] Date of Patent: Sep. 14, 1999

[54] RECIPROCATING REFRIGERANT COMPRESSOR

[75] Inventor: Ki Baek Kim, Suwon, Rep. of Korea

[73] Assignee: Samsung Electronics Co., Ltd., Suwon, Rep. of Korea

[21] Appl. No.: 08/957,362

[22] Filed: Oct. 24, 1997

[30] Foreign Application Priority Data

Dec. 19, 1996 [KR] Rep. of Korea ................ 96-68131

[51] Int. Cl.$^6$ .............................. F25B 43/02; C09K 5/00
[52] U.S. Cl. .................... 62/469; 62/114; 252/68
[58] Field of Search ................. 252/68; 62/469, 62/114; 417/902; 427/104, 118; 310/55

[56] References Cited

U.S. PATENT DOCUMENTS

| | | | |
|---|---|---|---|
| 5,548,973 | 8/1996 | Komine et al. | 62/469 |
| 5,685,163 | 11/1997 | Fujita et al. | 62/114 X |
| 5,711,165 | 1/1998 | Iizuka et al. | 62/114 X |

*Primary Examiner*—William Wayner
*Attorney, Agent, or Firm*—Burns, Doane, Swecker & Mathis, L.L.P.

[57] ABSTRACT

A closed reciprocating compressor for use in refrigeration cycle containing a refrigerant and a refrigerating machine oil, the refrigerant comprising a chlorine-free fluorocarbon and/or hydrofluorocarbon and having a critical temperature of 40° C. or higher and said refrigerating machine oil being circulated in the refrigeration cycle, the refrigerating machine oil comprising as a base oil an ester oil of one or more fatty acids, containing at least two ester linkages in the molecule and having a viscosity at 40° C. of 2 to 35 cSt and a viscosity at 100° C. of 1 to 6 cSt, the motor having a winding wire and an insulating film comprising of a conductor, an insulating material and a winding oil, and the winding oil being an ester wax. The compressor is free from the problems associated with poor compatibility of winding oil with the refrigerant and/or refrigerating machine oil, and renders a good workability during the motor manufacturing process and can improve the reliability of the refrigerating apparatus using it.

10 Claims, 6 Drawing Sheets

PARAFFIN WAX to be continued...

RECIPROCATING REFRIGERANT COMPRESSOR

BACKGROUND OF THE INVENTION

1. Field of the Invention

The present invention relates generally to a reciprocating compressor, and more particularly it relates to a reciprocating compressor using a chlorine-free fluorocarbon refrigerant having a critical temperature of above 40° C. and ester oils as a refrigerating machine oil, which contains a mixture of wax and ester oil as a winding oil for enamel wire of the motor insulating layer of the compressor.

2. Description of the Related Arts

In recent years, chlorine-containing chlorofluorocarbons have been included in the list of the compounds under regulation in use all over the world because of the problems involving environmental pollution, in particular, ozone depletion and global warming. All of flons included in the list of compounds under regulation in use are chlorine-containing chlorofluorocarbons such as R11, R12, R113, R114, R115, etc. In particular, R12 has been exclusively used as a refrigerant in refrigerating apparatus such as refrigerators, dehumidifiers, etc.

Accordingly, a refrigerant, which contains no chlorine in the molecule and is usable in place of R12, is required. Hydrofluorocarbon (HFC) or fluorocarbon have been noted as a substitute refrigerant. The examples of chlorine-free hydrofluorocarbon or fluorocarbon are listed below. Among others, R134a (1,1,1,2-tetrafluoroethane, $CH_2FCF_3$) is a typical example of such a refrigerant and chiefly studied. The chlorine-free hydrofluorocarbon or fluorocarbon has an unique chemical structure and hence very characteristic properties. Therefore, it has a very poor compatibility with refrigerating machine oils such as mineral oils and alkylbenzene oils which have been used in the conventional refrigeration system using R12 refrigerant, and hence it cannot be put into practical use at all. Thus, R134a adversely affects the lubrication and the resistance to frictional wear of the sliding portions of compression mechanical parts, and electrical insulating materials.

To avoid the problems associated with the incompatibility of R134a with refrigerating machine oil, it has been proposed to use ester oils of one or more fatty acids, which contains at least two ester linkages in the molecule (EP 485 979B1).

The conventional refrigerant compressor is shown in FIG. 1 and FIG. 2. FIG. 10A and FIG. 10B are systemic and schematic diagrams of refrigerating cycle for refrigeration apparatus, respectively. With reference to FIG. 10A and FIG. 10B, the refrigerating cycle comprises a compressor section 1, an expansion mechanism 7, a condenser 2,3,4,5, and an evaporator 8. Further, as shown in FIG. 1 and FIG. 2, the compressor comprises a closed vessel stored with refrigerating oil which accommodates a motor 101, a cover suction muffler 102, a suction spring 103, a suction pipe 104, a discharging pipe 105 and an assembly suction muffler 106. The electric motor of the compressor is composed of a stator and a rotor, which contains an insulating film 20 or 30. A rotating shaft as fitted in the rotor and the compressor section connected to the motor through the rotating shaft.

The structure of the electrically insulating enamel wire is depicted in FIG. 3 and FIG. 4. FIG. 3 and FIG. 4 depict the conventional insulating film and the inventive insulating film, respectively. They have the same structure, except the kind of winding oil (34 in FIG. 3, and 24 in FIG. 4). With reference to FIG. 3 and FIG. 4, a copper core wire 31 or 21 is double-coated with a polyester imide film 32 or 22 and then polyamide-imide film 33 or 23. Paraffin wax 34 or 24 as a winding oil is coated on the polyamide-imide film. An enamel wire is composed of a conductor 31 or 21, an insulating material 32 and 33, or 22 and 23, and a winding oil 34 or 24. The conductor is made of pure (above 99.9%) copper, and the polyester imide and polyamide-imide films are used as an insulating material. A winding oil such as paraffin wax is coated on the insulating material to improve the workability of the motor during its manufacturing.

An enamel wire is employed as a winding wire of electric and electronic appliances to interconvert the electric energy to the mechanical energy, vice versa.

For the conventional compressor containing R-12 and a mineral oil-based refrigerating machine oil, when paraffin wax is used as winding oil for motor insulating enamel wire, the paraffin wax shows good compatibility with the mineral oil used as a refrigerating machine oil.

However, for the compressor containing R-134a and an ester oil-based refrigerating machine oil, if paraffin wax is used as a winding oil for the motor insulating enamel wire, the paraffin wax, which is non-polar, shows a very poor miscibility with the ester oil, which is polar, resulting in a blockage of a capillary, in particular of the opening of the capillary which has a relatively low temperature and consequently a deterioration of the performance of the refrigerating apparatus.

Accordingly, there has been a need to provide a new winding oil which can be advantageously used for the insulating layer of the compressor containing R-134a and ester oil-based refrigerating machine oil and shows good compatibility or miscibility with R-134a and refrigerating machine oil.

SUMMARY OF THE INVENTION

The present invention provides a compressor which is free from the problems associated with poor compatibility of winding oil with the refrigerant and/or refrigerating machine oil, and renders a good workability during the motor manufacturing process and can improve the reliability of the refrigerating apparatus using it.

The present invention provides a closed reciprocating compressor for use in refrigeration cycle containing a refrigerant and a refrigerating machine oil, said compressor being composed of at least a compressor section, a condenser, an expansion mechanism, a dryer and an evaporator, said compressor further comprising a closed vessel stored with a refrigerating machine oil which accommodates a motor composed of a rotor and a stator, a rotating shaft fitted in the rotor and the compressor section connected to the motor through the rotating shaft, said refrigerant comprising a chlorine-free fluorocarbon and/or hydrofluorocarbon and having a critical temperature of 40° C. or higher and said refrigerating machine oil being circulated in the refrigeration cycle, said refrigerating machine oil comprising as a base oil an ester oil of one or more fatty acids, containing at least two ester linkages in the molecule and having a viscosity at 40° C. of 2 to 35 cSt and a viscosity at 100° C. of 1 to 6 cSt, said motor having a winding wire and an insulating film comprising of a conductor, an insulating material and a winding oil, and said winding oil being an ester wax.

BRIEF DESCRIPTION OF THE DRAWINGS

These and various other features and advantages of the present invention will be readily understood with reference to the following detailed description taken in conjunction with the accompanying drawings. In the drawings, like reference numerals designate like structural elements, and, in which.

DETAILED DESCRIPTION OF THE INVENTION

The present invention will now be described in more detail hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention provides a closed reciprocating compressor which comprises at least a compressor section, a condenser, an expansion mechanism, a dryer and an evaporator and is used in a refrigeration cycle containing a refrigerating machine oil and a refrigerant, said compressor being characterized in that it contains an ester wax as a winding oil for the motor insulating film.

The term 'ester wax' employed throughout the application means an ester of a fatty acid having more than 2 carbon atoms with an alkyl having 2–3 carbon atoms, which has a gravity at 25° C. of 0.73 to 0.75, and a flashing point of 10 to 20° C. A representative example includes a hydrolytic stearic ethyl ester containing naphtha as a carrier solvent.

The refrigerant employed in the compressor according to the present invention comprises mainly a chlorine-free fluorocarbon or hydrofluorocarbon and has a critical temperature of 40° C. or higher. Examples may include hydrocarbons such as difluoromethane (R32), pentafluoromethane (R125), 1,1,2,2-tetrafluoroethane (R134), 1,1,1,2-tetrafluoroethane (R134a), 1,1,2-trifluoroethane (R143), 1,1,1-trifluoroethane (R143a), 1,1-difluoroethane (R152a) and monofluoroethane (R161), and fluorocarbons such as hexafluoropropane (C216) and octafluorocyclobutane (C318). Among them, R134, R134a, R143, R143a and C216 may be advantageously employed as a substitute refrigerant since they have a boiling point similar to that of R12. R134a is preferably employed.

The ester oil used as a base oil of the refrigerating machine oil is a fatty acid ester having two or more ester linkages in the molecule, a viscosity at 40° C. of 2 to 35 cSt and a viscosity at 100° C. of 1 to 6 cSt. The ester oil may be obtained by reacting a fatty acid having 2 to 10 carbon atoms with a polyol such as neopentyl glycol or pentaerythritol. Specific examples may include those described in EP 485 979B1.

The ester oil may be incorporated with additives such as a hydrolysis stabilizer, an oxidation stabilizer or a foaming agent, in single or mixtures thereof. The specific kind and amount of these additives may be chosen without difficulty by those ordinary skill and do not limit the scope of the present invention.

Figure 1:
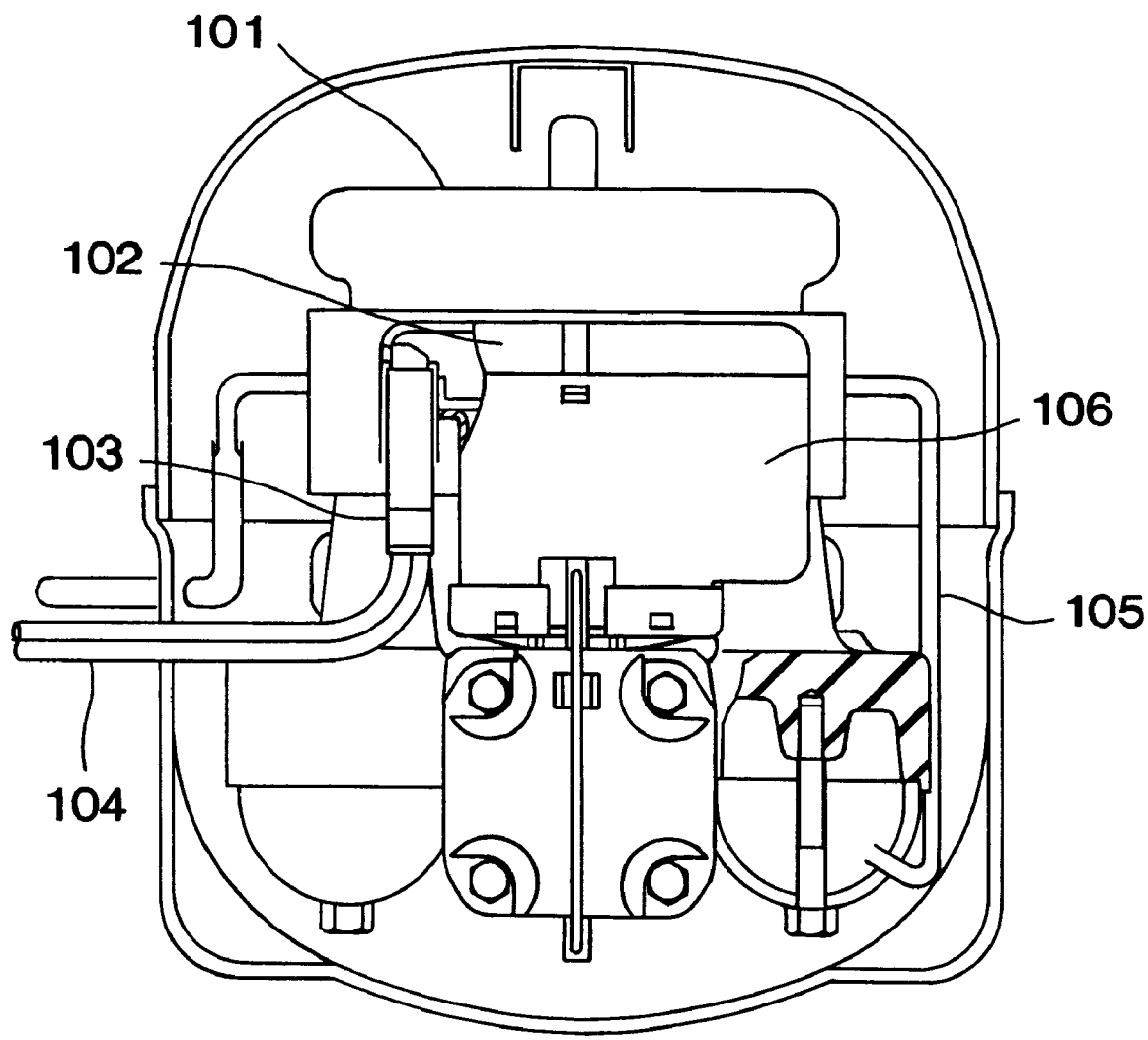
FIG. 1 is a front view depicting the compressor using the motor according to the present invention.
Figure 2:
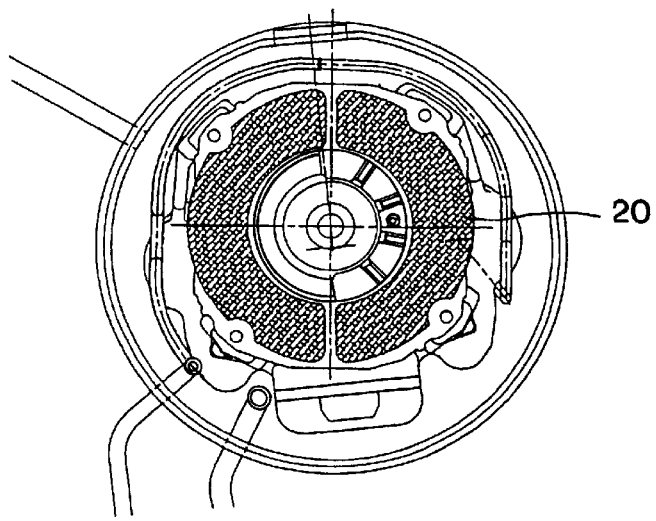
FIG. 2 is a plan view depicting the compressor using the motor according to the present invention.
Figure 3:
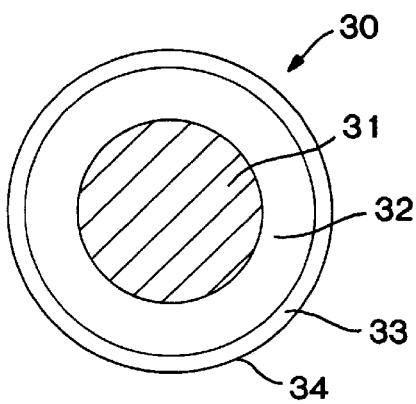
FIG. 3 is a sectional view depicting the enamel wire of motor insulation film used in the conventional compressor containing R-12 and a mineral oil-based refrigerating machine oil.
Figure 4:
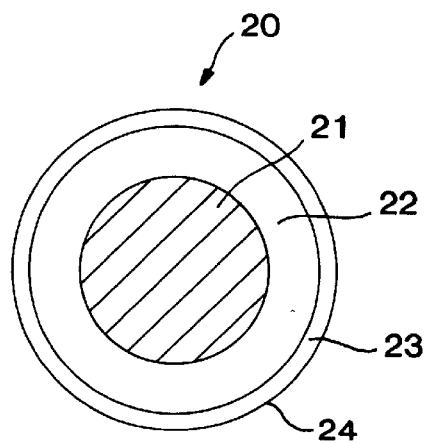
FIG. 4 is a sectional view depicting the enamel wire of motor insulation film used in the compressor containing R-134a and an ester oil-based refrigerating machine oil.

With reference to FIG. 4, the motor insulating film 20 of the compressor is composed of a conductor and an electrical insulating material. The conductor 21 is made of pure (above 99.9%) copper, and the insulating material 22, 23 is made of a polyester-amide film 22 as a lower layer and an auto-lubricating polyamide-imide film 23 as an upper layer. An ester wax is used as a winding oil 24, which has a heat resistant grade of 200° C. The polyamide-imide as the upper layer 23 of the insulating material film is of auto-lubricating and has a gravity of 1.0 to 1.1, a viscosity at 25° C. of 300 to 3000 cps, and a flashing point of 20 to 40° C.

The diameter of the motor insulating film 20 is in a range from φ 0.2 to φ 1.5.

The compressor according to the present invention was tested for the formation of deposit in the capillary tube after its operation for a certain period of long time.

EXAMPLE 1

Figure 5:
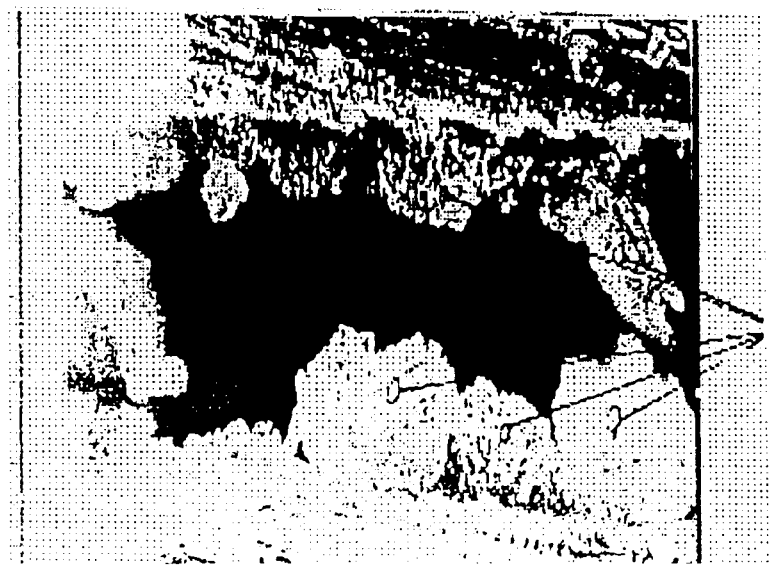
FIG. 5 is a photograph showing the capillary tube in the refrigerating cycle when paraffin wax-based winding oil is used for the compressor containing R-134a and an ester oil-based refrigerating machine oil.

A refrigerant compressor comprising a condenser, an expansion mechanism, a dryer and an evaporator, containing R-134a as a refrigerant and an ester oil as a refrigerating machine oil (ester of neopentyl glycol with octane acid, which has a viscosity at 40° C. of 4.8 cSt and a viscosity at 100° C. of 1.7 cSt), and employing enamel wire coated with paraffin wax ( brand name ) as a motor insulation film was operated continuously at an ambient temperature of about 43° C. for 1000 hours. Then, whether any deposit is formed or not within the capillary of the compressor was examined by using a microscope. The results are shown in FIG. 5.

EXAMPLE 2

A procedure in Example 1 was repeated except that the refrigerant compressor uses as a winding oil hydrolytic stearic ethyl ester comprising naphtha carrier solvent, having a viscosity at 25° C. of 0.73–0.75 and a flashing point of 10–20° C., instead of paraffin wax. The results are shown in FIG. 6.

Since non-polar paraffin wax is not miscible with the refrigerating machine oil, ester oil, paraffin wax is deposited at the outlet of capillary tube at which the temperature suddenly drops (−10° C. to −30° C.), while the ester oil returns into the compressor via the evaporator. When this is repeatedly done, the tube is clogged up and eventually the refrigerating machine cannot perform temperature characteristics (FIG. 5).

Figure 6:
FIG. 6 is a photograph showing the capillary tube in the refrigerating cycle when an ester wax-based winding oil is used for the compressor containing R-134a and an ester oil-based the refrigerating machine oil.

To the contrary, there is no deposit within the capillary tube of the compressor using ester wax according to the present invention (FIG. 6).

Figure 7:
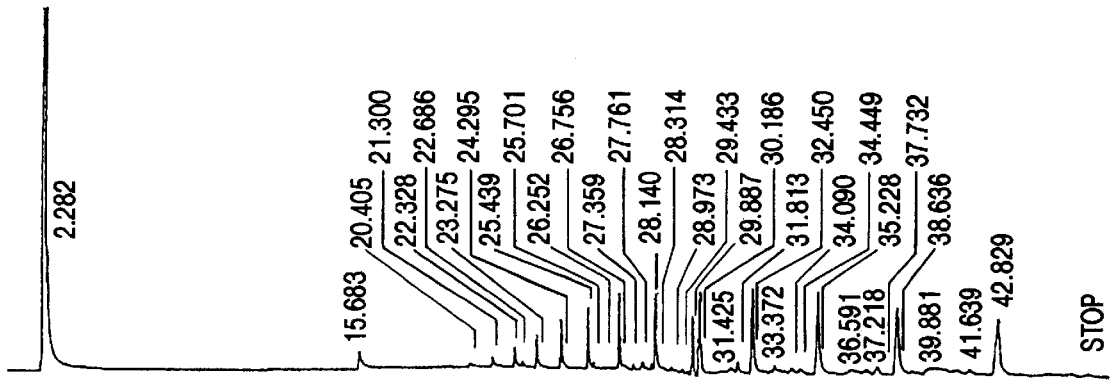
FIG. 7 is a gas chromatogram of paraffin wax.
Figure 8:
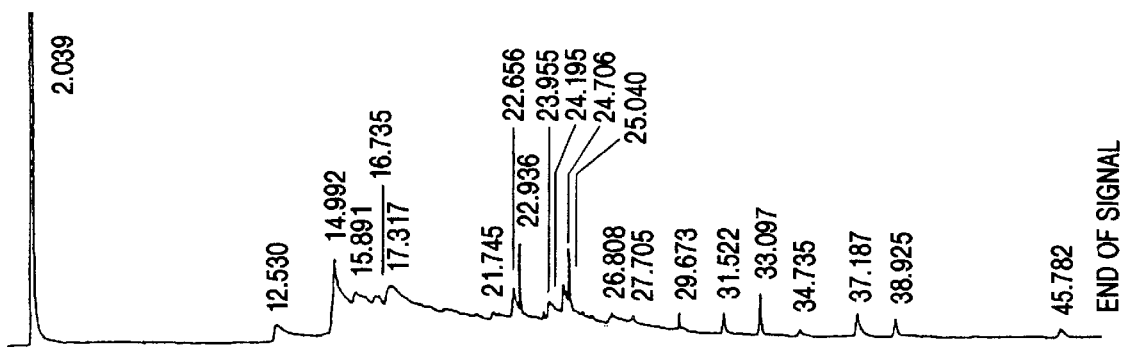
FIG. 8 is a gas chromatogram of ester wax employed as a winding oil for the motor insulation film according to the present invention.
Figure 9:
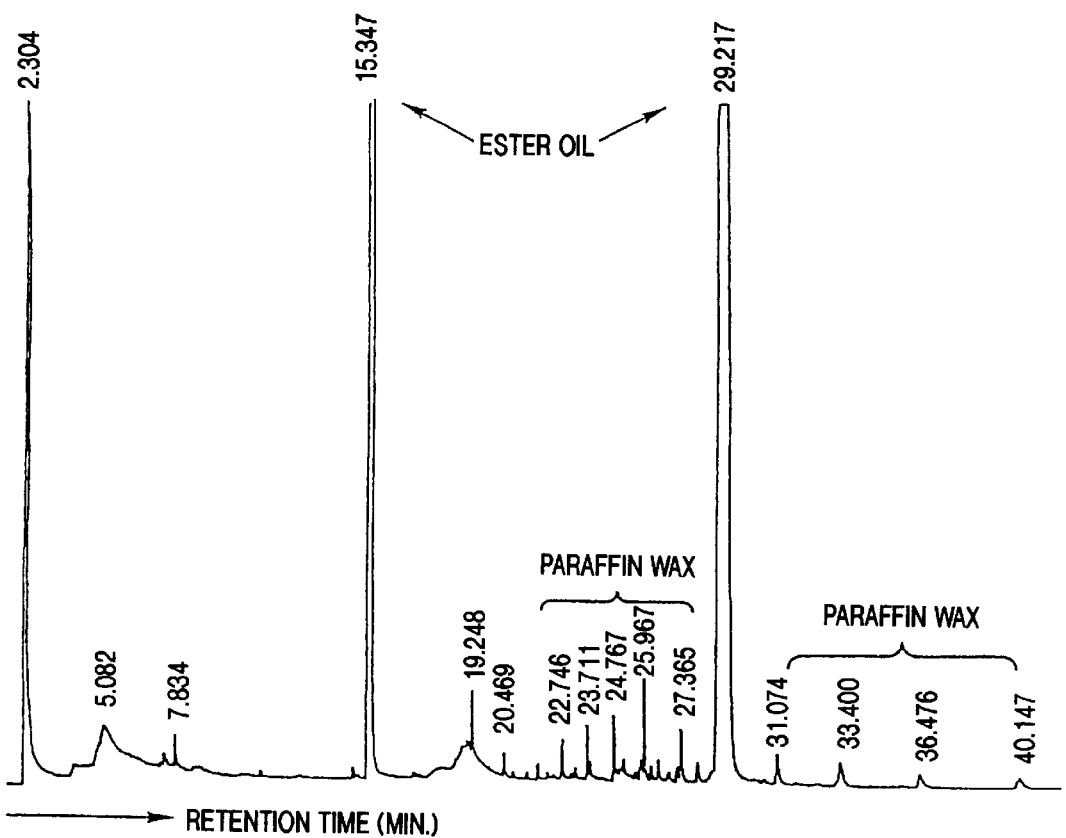
FIG. 9 is a gas chromatogram of the deposit in the motor in Example 1, showing the peak of paraffin wax.
Figure 10A:
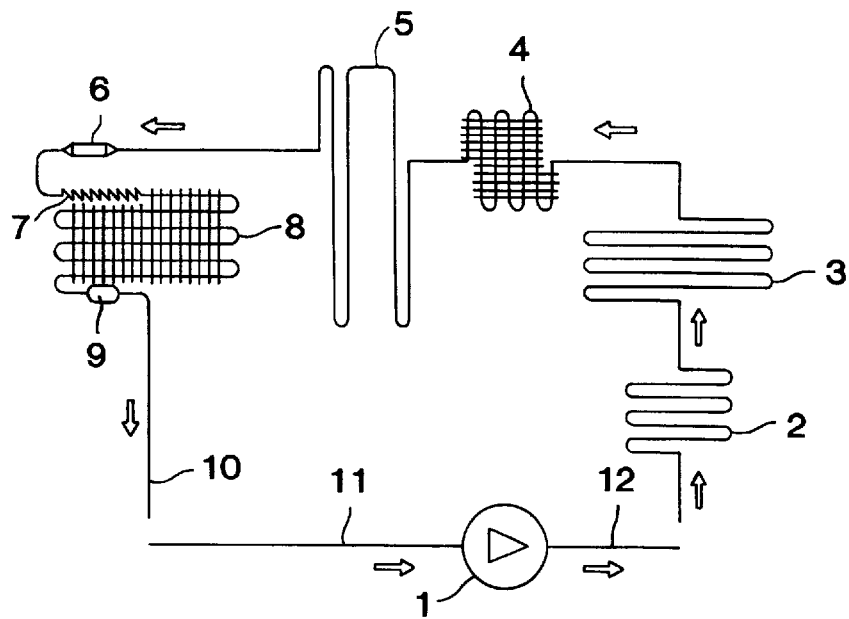
FIGS. 10A and 10B are systemic and schematic diagrams of the refrigerating cycle, respectively.
Figure 10B:
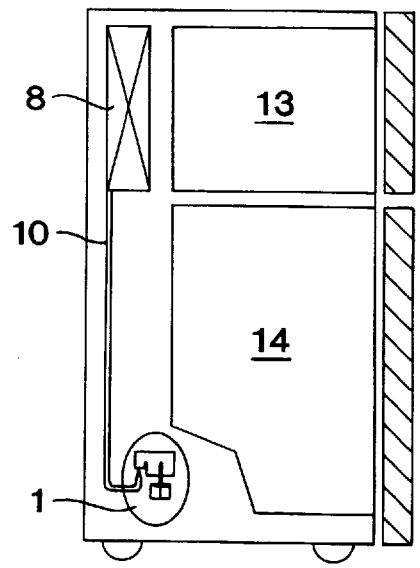

In order to determine if the deposit within the capillary tube is paraffin wax, the deposit was analyzed by using gas chromatography. First, paraffin wax and hydrolytic stearic ethyl ester wax were subjected to gas chromatography to give their chromatogram (FIG. 7 and FIG. 8). The deposit obtained in Example 1 was washed with a detergent such as hexane and subjected to gas chromatography to give its chromatogram. The chromatogram is depicted in FIG. 9. FIG. 9 indicates same peaks as those in FIG. 7 which depicts the gas chromatogram of paraffin wax.

As described above, when an ester wax is used as a winding oil for an enamel wire motor insulation film of refrigerant compressor, which contains R-134a as a refrigerant and ester oils as a refrigerating machine oil, the blockage in the capillary tube of the compressor can be effectively prevented.

Although preferred embodiments of the present invention have been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A closed reciprocal compressor for use in refrigeration cycle containing a refrigerant and a refrigerating machine oil comprising, at least a compressor section a condenser, an expansion mechanism, a dryer and an evaporator, said compressor further comprising a closed vessel stored with a refrigerating machine oil which accommodates a motor composed of a rotor and a stator, a rotating shaft fitted in the rotor and the compressor section connected to the motor through the rotating shaft, said refrigerant comprising a chlorine-free fluorocarbon and/or hydrofluorocarbon and having a critical temperature of 40° C. or higher and said refrigerating machine oil being circulated in the refrigeration cycle, said refrigerating machine oil comprising as a base oil an ester oil of one or more fatty acids, containing at least two ester linkages in the molecule and having a viscosity at 40° C. of 2 to 35 cSt and a viscosity at 100° C. of 1 to 6 cSt, said motor having a winding wire and an insulating film comprising of a conductor, an insulating material and a winding oil, and said winding oil being an ester wax.

2. A closed reciprocating compressor according to claim 1, wherein said insulating film comprises copper conductor having a purity of 99.9% or above; and a double insulating layer, a lower layer thereof being polyester amide and an upper layer thereof being self-lubricating polyamide-imide; and said winding oil being coated onto a surface of the upper layer, and wherein it has a heat insulation grade of 200° C.

3. A closed reciprocating compressor according to claim 2, wherein said self-lubricating polyamide-imide has a gravity of 1.0–1.1, a viscosity at 25° C., and flashing point of 20–40° C.

4. A closed reciprocating compressor according to claim 2, wherein said ester oil is an ester of a branched fatty acid having 2 to 10 carbon atoms and a polyol selected from neopentyl glycol and pentaerythritol.

5. A closed reciprocating compressor according to claim 4, wherein said ester oil comprises one or more additives selected from a group consisting of hydrolysis stabilizers, oxidation stabilizers and foaming agents.

6. A closed reciprocating compressor according to claim 2, wherein said insulation film has a diameter of φ 0.2–φ 1.5.

7. A closed reciprocating compressor according to claim 1, wherein said ester oil is an ester of a branched fatty acid having 2 to 10 carbon atoms and a polyol selected from neopentyl glycol and pentaerythritol.

8. A closed reciprocating compressor according to claim 7, wherein said ester oil comprises one or more additives selected from a group consisting of hydrolysis stabilizers, oxidation stabilizers and foaming agents.

9. A closed reciprocating compressor according to claim 1, wherein said insulation film has a diameter of φ 0.2–φ 1.5.

10. A closed reciprocating compressor according to claim 1, wherein said ester wax is hydrolytic stearic ethyl ester which has a gravity at 25° C. of 0.73–0.75 and a flashing point of 10–20° C., and contains naphtha as a carrier solvent.

* * * * *